J. H. WOLF.
COLLAR PAD.
APPLICATION FILED MAY 7, 1909.
951,167.
Patented Mar. 8, 1910.
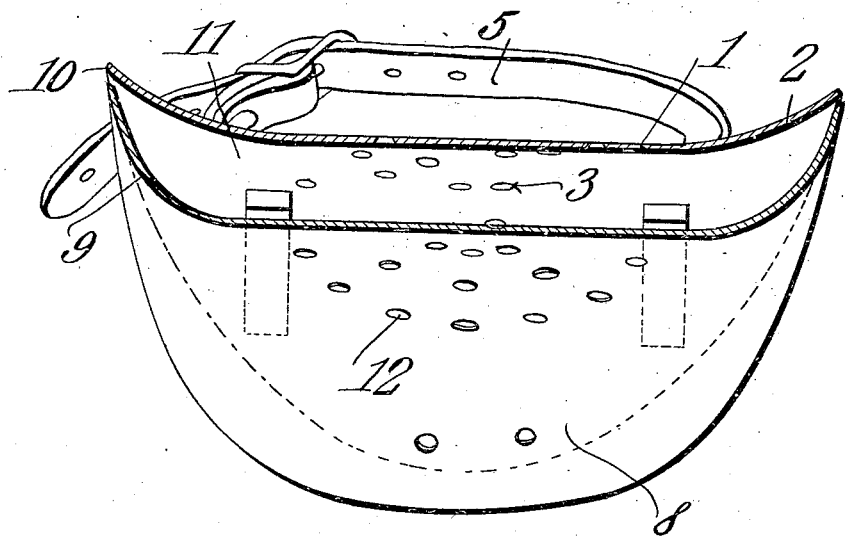
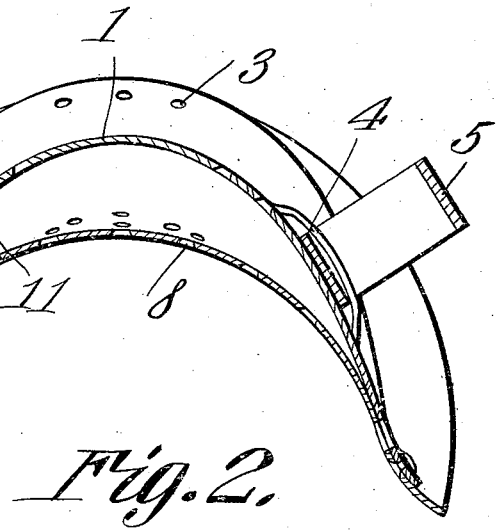
Witnesses
E. W. Stewart
Francis Boyle
Inventor
John H. Wolf.
By C. A. Snow & Co.
Attorneys

UNITED STATES PATENT OFFICE.

JOHN H. WOLF, OF MOUNT HOREB, WISCONSIN.

COLLAR-PAD.

951,167.  Specification of Letters Patent.  Patented Mar. 8, 1910.

Application filed May 7, 1909. Serial No. 494,525.

*To all whom it may concern:*

Be it known that I, JOHN H. WOLF, a citizen of the United States, residing at Mount Horeb, in the county of Dane and State of Wisconsin, have invented a new and useful Collar-Pad, of which the following is a specification.

My invention relates to collar pads, particularly horse collar pads, and has for an object to provide a device of this character that will permit the circulation of air between the collar and the horse to keep the neck of the animal cool and prevents sweating between the neck and pad.

Another object is to provide a device of this character that will not chafe the neck of the animal or cause the same to become sore as do many of the usual forms of collar pads.

Still another object is to provide a device of this character that will have no projections to catch in the adjacent portions of the harness, will fit any horse's neck and equally distribute the weight of the collar over the embraced portions of the neck.

With these advantages and other objects in view, which will be shown in the following specification, and set forth in the claim, my invention embraces the structure illustrated in the accompanying drawing, wherein:—

Figure 1 is a longitudinal section of the collar pad. Fig. 2 is a cross section of the same.

One of the difficulties experienced in the use of the usual form of horse collar pads is that the neck fitting portion of the pad tightly clamps the horse's neck and by constantly slipping to conform to the motion of the neck, irritates and chafes the neck until finally the neck becomes sore and the animal must be taken out of commission. To overcome this difficulty I have devised a collar pad of rigidly combined members which equally distribute the weight of the collar on the embraced portion of the horse's neck and which will serve as a bearing to prevent the motion of the collar being transmitted to the animal's neck.

Referring now to the drawings, in which like characters of reference designate similar parts wherever they occur, 1 is an arched frame adapted to conform to the contour of the under side of a horse collar and form a seat for the same. The arched frame 1 terminates in flaring ends 2 whereby, when the horse collar is seated in the arched frame 1 any lateral movement of the horse collar is prevented. Formed in the flaring ends 2 and intermediate portions of the arched frame 1 is a plurality of holes 3 to permit the circulation of air through the arch. Adjacent the lateral edges of the arch frame are eyes 4 struck from the frame and adapted to receive the transverse straps 5 whereby the arched frame is secured to and under the horse collar. The lower ends 6 of the opposite sides of the arched frame have formed therein openings through each of which pass the rivets 7 which pass thence through the opposite lower ends of a second arched frame 8, arranged longitudinally under the arched frame 1. The arched frame 8 has flaring ends 9 adapted to conform to the transverse outline of the flaring ends 2 of the upper arched frame 1, and to be held spaced from the ends thereof as shown at 10 to permit the admission of air to the air space 11 formed between the tops of the upper and lower arched frames 1 and 8.

The lower arched frame 8 is provided with a plurality of perforations to permit the admission of air from the air space to the neck of the horse to ventilate the neck and keep it cool.

As may easily be seen, the members of the collar pad are rigidly held together so that the parts cannot work loose and allow the horse's collar to slide from its proper position. The flared ends of the under member conform to the outline of the flared ends of the upper member and will support said ends when excessive weight is transmitted by the collar to the upper arch and prevent any buckling of the same. The chafing motion of the collar will be effectually prevented from reaching the horse's neck.

From the foregoing description, taken in connection with the accompanying drawings, the construction and operation of my invention may easily be understood without a more extended description, it being understood that various changes in the form, proportion and minor details of construction may be made without sacrificing any of the advantages or departing from the spirit of the invention.

Having described my invention, what I claim is:—

A collar pad comprising upper and lower arched plates secured together at their ends and having their sides upwardly flared and spaced apart, the sides of the lower plate being sharply upturned to present their edges to the under side of the upper plate within the borders thereof and support said plate when excessive weight is placed thereon, both plates being perforated, and the upper plate having retaining loops struck up therefrom near its ends.

In testimony that I claim the foregoing as my own, I have hereto affixed my signature in the presence of two witnesses.

JOHN H. WOLF.

Witnesses:
GILBERT MICKELSON,
O. P. BERG.